United States Patent [19]

Friedrichs

[11] 4,333,663
[45] Jun. 8, 1982

[54] FLAT GASKET

[75] Inventor: Karl-Gerd Friedrichs, Leverkusen, Fed. Rep. of Germany

[73] Assignee: Goetze AG, Burscheid, Fed. Rep. of Germany

[21] Appl. No.: 103,217

[22] Filed: Dec. 13, 1979

[30] Foreign Application Priority Data

Dec. 27, 1978 [DE] Fed. Rep. of Germany ....... 2856186

[51] Int. Cl.³ .............................................. F16J 15/12
[52] U.S. Cl. ................................................ 277/235 R
[58] Field of Search ...................... 277/235 B, 166, 22

[56] References Cited

U.S. PATENT DOCUMENTS 1,928,585 9/1933 Balfe ................................ 277/235 B
1,932,539 10/1933 Victor ............................. 277/235 B

FOREIGN PATENT DOCUMENTS 1074341 7/1964 Fed. Rep. of Germany .

Primary Examiner—Robert I. Smith
Attorney, Agent, or Firm—Spencer & Kaye

[57] ABSTRACT

A flat gasket has at least one opening and a metal frame surrounding the opening and attached to a gasket edge defining the opening. The frame has rims on both sides of the gasket and metal overlays arranged adjacent the frame in a face-to-face relationship with the gasket on both sides thereof. Each overlay is formed as a flap-like extension of the rims on both sides of the gasket along a linear length portion of the frame.

5 Claims, 3 Drawing Figures

FLAT GASKET

BACKGROUND OF THE INVENTION

This invention relates to a flat gasket, particularly to a cylinder head gasket for internal combustion engines. The gasket has at least one aperture; the gasket edge defining the aperture is protected by a sheet metal border flange which constitutes a frame enclosing the aperture. In the zone of the sheet metal border flange—hereafter frame—on both sides of the gasket, planar sheet metal overlays are provided.

Gaskets made of sheet metal or plates of soft material, such as cylinder head gaskets used in internal combustion engines, have apertures which are in precise alignment with an engine cylinder (combustion chamber) formed by complemental cavities in the cylinder head and in the cylinder block tightened to one another with the interposition of the gasket. Such apertures are metal-framed to protect the gasket zones, for example, against the effect of the hot combustion gases in the cylinders or they are provided for the purpose of providing an increased sealing pressure at the gasket zone around the opening, since such a zone is exposed to particularly large stresses. It is further known, as disclosed, for example, in German Pat. No. 1,074,341, to cover certain other gasket zones with sheet metal overlays, for equalizing the sealing pressure distribution. Further, such overlays are necessary for protecting the gasket in the immediate vicinity of the gasket openings associated with the combustion chambers in diesel engines of current design, since such engines have pre-combustion chambers which are provided in the cylinder head and which, during the operation of the engine, are heated to a red glow at their bottom supported on the cylinder head gasket. Further, these locations are exposed to substantial mechanical stresses, since the half-combusted gases in the pre-combustion chambers flow, through single-hole nozzles, with a very high velocity into the respective cylinders.

Heretofore the protective metal overlays have been formed in the desired zones of the gasket by flap-like extensions of the upper rim portion (upper leg) of the frame, so that in a single operation a framing of the aperture and a protective overlay could be provided. Such a procedure however, does not provide an overlay on the other, bottom side of the gasket which is oriented toward the cylinder block. Thus, as a result, in this zone the sealing pressure is reduced. An apparently obvious remedy, namely an extension of the lower frame rim over zones of the gasket underface is not feasible, because during the assembly of the gasket structure, upon bending the second flap, substantial stresses and expansions would appear because of the circularly extending frame. Such stresses could lead to a breakage of the frame. Therefore, in practice, that face of the cylinder head gasket which is oriented towards the engine block has been provided with a separately mounted and secured metal overlay. Thus, in view of the above, either such overlay had to be dispensed with, in which case an optimal sealing pressure could not be obtained, or a separate overlay had to be provided which, in turn, involves a relatively complex and expensive procedure.

SUMMARY OF THE INVENTION

It is an object of the invention to provide an improved flat gasket of the above-outlined type, having at least one metal-framed opening and, in the zone of the frame, having bilateral metallic overlays which can be provided simply, inexpensively and in a single operation.

This object and others to become apparent as the specification progresses, are accomplished by the invention, according to which, briefly stated, on either side of the gasket the respective frame rim is, along a length portion, extended away from the frame to form a flap-like extension constituting an overlay and further, the frame is linear along the above-noted length portion.

During the mounting of the frame into the gasket by bending the two longitudinal halves of the sheet metal strip 180° with respect to one another, the thus formed frame, together with the flap-like extensions, is uniformly stressed by virtue of the linear course of the frame in the zone of the extensions. Thus, during this mounting operation, excessive stresses and elongations cannot occur and consequently the frame will not break.

The flat gasket according to the invention preferably serves, as a cylinder head gasket, for sealing the cylinder head and the cylinder block in diesel engines having pre-combustion chambers provided in the cylinder head. Accordingly, all gasket openings that are to be associated with respective combustion chambers are equipped with the sheet metal frame according to the invention; each flap-like extension has the shape of a circular segment whose straight edge adjoins the respective flange edge of the frame. The generally circular bottom of each pre-combustion chamber thus engages the sheet metal only over a part of the bottom area, while the remaining bottom area closes off the cylinder. The small hollow space which is obtained due to the deviation of the course of the sealing edge from the circular cylinder and in which oil carbon can accumulate has not been found to have an adverse effect The frame and overlays of the invention may also be provided at other openings of the flat gasket, particularly where, in the zone adjoining the opening, a high local sealing pressure and/or high protective effect is to be achieved. Further, the invention may find application in both sheet metal gaskets and gaskets made of a soft material.

Thus, the invention makes it possible to provide marginal gasket zones defining an opening, with a sheet metal frame and, in the same mounting operation, with bilateral protective overlays in the immediate vicinity of the gasket openings without loss of sealing pressure. It is of particular advantage that the overlays are firmly attached to the frame, since they may both form an integral part thereof, in contradistinction to prior art structures where, as discussed earlier, the overlay on one gasket face had to be provided separately. In addition, because the frame cannot turn with respect to the gasket, the frame cannot change its position during shipment, installation or service.

DESCRIPTION OF THE PREFERRED EMBODIMENTS

Figure 1:
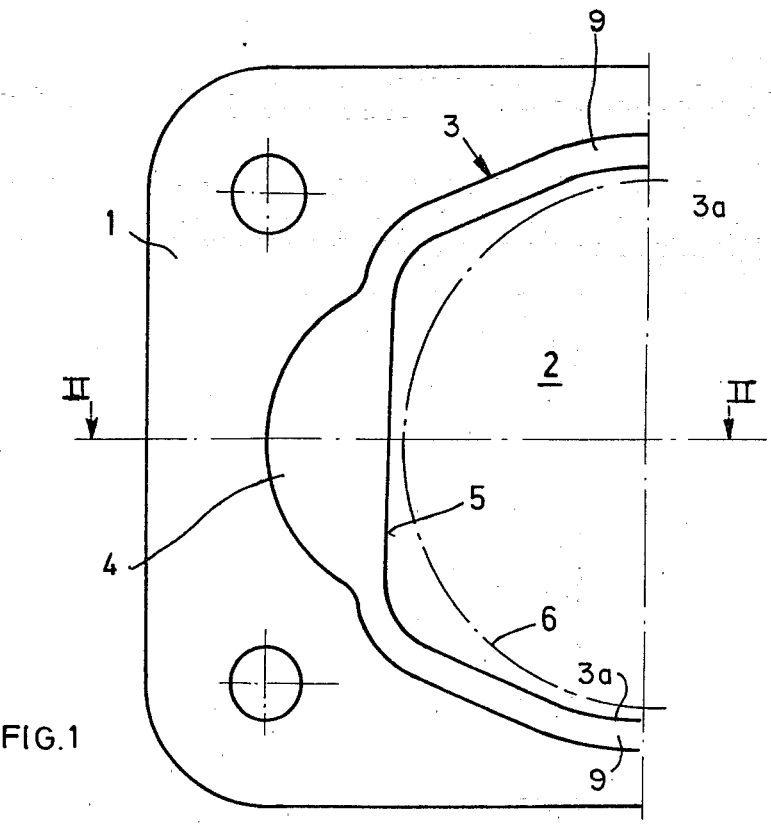
FIG. 1 is a plan view of a preferred embodiment of a flat gasket according to the invention.
Figure 2:
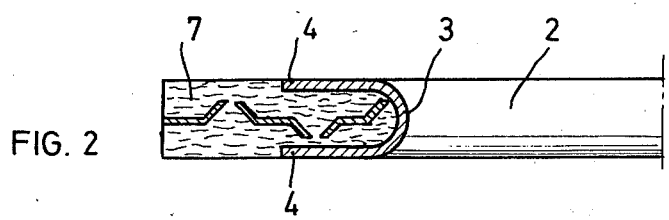
FIG. 2 is a sectional view taken along line II—II of FIG. 1.

Turning to FIGS. 1 and 2 there is shown a here relevant portion of a cylinder head gasket 1 which is made of a soft material and which has an opening 2 to be aligned with a cylinder 6 (shown only symbolically in dash-dotted line) of an internal combustion engine. The edge zone of the gasket opening is provided with a sheet metal frame 3. The sheet metal frame 3 which has curvilinear length portions 3a, is bent about the closed gasket edge, whereby rims 9 on opposite faces of the gasket are formed. Along a length portion of the frame 3, on both sides of the gasket body 7, there extends a flap 4 in the plane of the respective gasket face. Each flap 4 has the shape of a circular segment and constitutes a protective metal overlay which supports, in the installed state, the bottom of a pre-combustion chamber provided in the cylinder head. The frame zone 5 in which the flaps 4 are connected with the outwardly bent frame rims, has a linear course.

The frame 3, together with the flaps 4, is mounted in the gasket by firmly pressing the metal frame 3 and the metal overlays 4 into the gasket body 7; as a result, when the gasket is in its installed state between the cylinder head and the cylinder block, an optimum sealing pressure is obtained.

Figure 3:
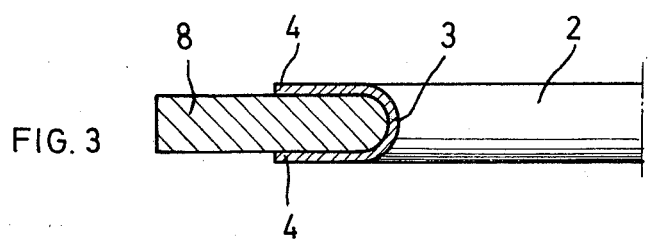
FIG. 3 is a sectional view, similar to FIG. 2, of a gasket made of a different material.

Turning to FIG. 3, the embodiment shown therein differs from the first-described embodiment only in that the gasket body 8 is sheet metal. Thus, in this embodiment too, in the zone of the frame and the flaps a uniform, high sealing pressure is obtainable.

It will be understood that the above description of the present invention is susceptible to various modifications, changes and adaptations, and the same are intended to be comprehended within the meaning and range of equivalents of the appended claims.

What is claimed is:

1. In a flat gasket having a closed edge defining an opening, a metal frame surrounding the opening and having curvilinear length portions bent over the closed edge along the length thereof; said frame having rims on both sides of the gasket and a part connecting the rims and extending over said edge; and metal overlays arranged adjacent the frame in a face-to-face relationship with the gasket on both sides thereof; the improvement wherein each overlay comprises a flap-like, one-piece, integral extension of the rims on both sides of said gasket along a length portion of said frame and further wherein said length portion has a linear course.

2. A flat gasket as defined in claim 1, wherein each said extension has the shape of a circular segment adjoining the respective rim along an imaginary straight edge of the circular segment.

3. A flat gasket as defined in claim 1, wherein all openings of said gasket are provided with said frame and said overlays.

4. In a cylinder head gasket tightened between a cylinder head and a cylinder block of a diesel engine, the diesel engine including pre-combustion chambers formed in said cylinder head and associated cylinders formed by aligned cavities in said cylinder head and said cylinder block; each pre-combustion chamber having an outer bottom face in engagement with the gasket; the cylinder head gasket having at least one closed edge defining an opening in alignment with one of said cylinders, a metal frame surrounding the opening and having curvilinear length portions bent over the closed edge along the length thereof; the frame having rims on both sides of the gasket and having a part connecting the rims and extending over said edge; and metal overlays arranged adjacent the frame in a face-to-face relationship with the gasket on both sides thereof; the improvement wherein each overlay comprises a flap-like, one-piece integral extension of the rims on both sides of said gasket along a length portion of said frame and further wherein said length portion has a linear course.

5. A cylinder head gasket as defined in claim 4, wherein overlays arranged on the gasket side oriented towards the cylinder head are in engagement with said outer bottom face of a respective said pre-combustion chamber.

* * * * *